(12) United States Patent
Sung

(10) Patent No.: US 12,312,663 B2
(45) Date of Patent: May 27, 2025

(54) CHROMIUM STEEL HAVING EXCELLENT HIGH-TEMPERATURE OXIDATION RESISTANCE AND HIGH-TEMPERATURE STRENGTH, AND METHOD OF MANUFACTURING SAME

(71) Applicant: POSCO, Pohang-si (KR)

(72) Inventor: Hyun-Je Sung, Pohang-si (KR)

(73) Assignee: POSCO, Pohang-si (KR)

( * ) Notice: Subject to any disclaimer, the term of this patent is extended or adjusted under 35 U.S.C. 154(b) by 94 days.

(21) Appl. No.: 17/769,087

(22) PCT Filed: Sep. 25, 2020

(86) PCT No.: PCT/KR2020/013144
§ 371 (c)(1),
(2) Date: Apr. 14, 2022

(87) PCT Pub. No.: WO2021/080205
PCT Pub. Date: Apr. 29, 2021

(65) Prior Publication Data
US 2024/0102136 A1    Mar. 28, 2024

(30) Foreign Application Priority Data
Oct. 22, 2019 (KR) .................. 10-2019-0131380

(51) Int. Cl.
*C22C 38/22*    (2006.01)
*C21D 8/02*    (2006.01)
(Continued)

(52) U.S. Cl.
CPC ............ *C22C 38/22* (2013.01); *C21D 8/0205* (2013.01); *C21D 8/0226* (2013.01);
(Continued)

(58) Field of Classification Search
None
See application file for complete search history.

(56) References Cited

U.S. PATENT DOCUMENTS

| 4,859,649 A | 8/1989 | Bohnke et al. |
| 2002/0117239 A1 | 8/2002 | Oku et al. |

(Continued)

FOREIGN PATENT DOCUMENTS

| CN | 102471817 A | 5/2012 |
| CN | 103276307 A | 9/2013 |

(Continued)

OTHER PUBLICATIONS

International Search Report dated Jan. 12, 2021 issued in International Patent Application No. PCT/KR2020/013144 (with English translation).

(Continued)

Primary Examiner — Anthony M Liang
(74) Attorney, Agent, or Firm — Morgan Lewis & Bockius LLP

(57) ABSTRACT

Provided are chromium steel having excellent high-temperature oxidation resistance and high-temperature strength, and a method of manufacturing same. The present invention relates to chromium steel, having excellent high-temperature oxidation resistance and high-temperature strength, which comprises, by weight %, 0.1% or less of C (not including 0%), 0.7% or less of Si (not including 0%), 0.1% or less of Mn (not including 0%), 0.01% or less of S (not including 0%), 0.03% or less of P (not including 0%), 27-33% of Cr, 3.5% or less of Al (not including 0%), 2.5% or less of Nb (not including 0%), 6.5% or less of W (not including 0%), 0.5% or less of Mo (not including 0%), 0.3% or less of Ti (not including 0%), 0.015% or less of N (not including 0%)

(Continued)

and the remainder being Fe and unavoidable impurities, and satisfies relational expression (1).

2 Claims, 4 Drawing Sheets

(51) Int. Cl.
    *C21D 9/46* (2006.01)
    *C22C 38/00* (2006.01)
    *C22C 38/02* (2006.01)
    *C22C 38/04* (2006.01)
    *C22C 38/06* (2006.01)
    *C22C 38/26* (2006.01)
    *C22C 38/28* (2006.01)

(52) U.S. Cl.
    CPC ............ *C21D 8/0263* (2013.01); *C21D 9/46* (2013.01); *C22C 38/001* (2013.01); *C22C 38/02* (2013.01); *C22C 38/04* (2013.01); *C22C 38/06* (2013.01); *C22C 38/26* (2013.01); *C22C 38/28* (2013.01); *C21D 2211/005* (2013.01)

(56) References Cited

U.S. PATENT DOCUMENTS

| | | |
|---|---|---|
| 2009/0104494 A1 | 4/2009 | Quadakkers et al. |
| 2012/0145285 A1 | 6/2012 | Hattendorf et al. |
| 2019/0264307 A1 | 8/2019 | Yamamoto et al. |
| 2021/0059019 A1 | 2/2021 | Mizutani et al. |
| 2021/0087660 A1 | 3/2021 | Jung et al. |

FOREIGN PATENT DOCUMENTS

| | | |
|---|---|---|
| CN | 105506489 A | 4/2016 |
| JP | 2014-214348 A | 11/2014 |
| JP | 2017-071829 A | 4/2017 |
| JP | 6562188 B1 | 8/2019 |
| KR | 10-1996-0006329 B1 | 5/1996 |
| KR | 10-2002-0052993 A | 7/2002 |
| KR | 10-2008-0097459 A | 11/2008 |
| KR | 10-2012-0061851 A | 6/2012 |
| KR | 10-2020513 B1 | 9/2019 |

OTHER PUBLICATIONS

Chinese Office Action dated Sep. 29, 2022, issued in corresponding Chinese Patent Application No. 202080073993.9.

(A)

(B)

CHROMIUM STEEL HAVING EXCELLENT HIGH-TEMPERATURE OXIDATION RESISTANCE AND HIGH-TEMPERATURE STRENGTH, AND METHOD OF MANUFACTURING SAME

CROSS-REFERENCE OF RELATED APPLICATIONS

This application is the U.S. National Phase under 35 U.S.C. § 371 of International Patent Application No. PCT/KR2020/013144, filed on Sep. 25, 2020, which in turn claims the benefit of Korean Application No. 10-2019-0131380, filed on Oct. 22, 2019, the entire disclosures of which applications are incorporated by reference herein.

TECHNICAL FIELD

The present disclosure relates to a chromium steel having excellent oxidation resistance and heat resistance and a method of manufacturing the same, and more particularly, to a chromium steel having excellent high-temperature strength by precipitating a Laves phase and carbonitrides on ferrite, which is a structural phase of steel, and having high-temperature oxidation resistance by introducing a stable oxide layer with an alloy to chromium and aluminum, and a method of manufacturing the same.

BACKGROUND ART

Global electricity demand continues to grow. Among various power sources, thermal power and nuclear power are among the cheapest forms of power generation in terms of generation unit prices, and in the future, the share of the power generations in global power generation capacity is not expected to decrease. Things to consider in the future construction of thermal and nuclear power plants are environmentally friendly power plant construction and high efficiency in energy use. In order to increase power generation efficiency, it has been required to increase the temperature of steam supplied to turbines and to increase pressure. Accordingly, it is essential to improve heat resistance of a material of a boiler producing steam, in detail, to increase yield strength at high temperature. This is because high-temperature creep deformation is caused by a prolonged period of time under stress in the elastic range region of the material. In addition, it is also significantly important to increase oxidation resistance to extend the lifespan when considering environmental factors exposed to continuous high-temperature steam.

Among steels applied to high temperatures, austenitic stainless steel, which contains a large amount of expensive alloying elements such as nickel, has poor physical properties such as low thermal conductivity and a high coefficient of thermal expansion, and has limitations in the use thereof due to difficulties in manufacturing large-sized parts. On the other hand, chromium steel excludes expensive nickel alloy and is widely used due to having excellent creep strength, weldability, corrosion resistance, oxidation resistance and the like. In the case of nuclear power generation, stability is being secured by replacing austenitic stainless steel with chromium steel that may guarantee long-term integrity to prevent a swelling phenomenon caused by neutron irradiation.

Solid solution strengthening and precipitation strengthening methods are applied to improve high temperature properties of heat-resistant chromium steel. To this end, vanadium, niobium, and titanium, which are solid solution strengthening elements and M(C,N) carbonitride (M=metal element, C=carbon, N=nitrogen) forming elements, are mainly alloyed. The disadvantage of low-alloy based ferritic, bainitic and martensitic heat-resistant chromium steels to which the above methods are applied is that high-temperature oxidation and high-temperature strength are significantly inferior at conditions above 620° C. In the case of replacement thereof with austenitic stainless steel guaranteed to be used at high temperatures of 650° C. or lower, it is expected that the limitations due to poor physical properties will be significantly large. On the other hand, nickel superalloys may be used at high temperatures of 700° C. or higher, but are significantly expensive. It is essential to supplement all of these shortcomings and to establish an alloy design and manufacturing method for the development of steel with excellent high-temperature oxidation resistance and high-temperature strength.

As a conventional technology that may replace austenitic stainless steel or the like, Patent Document 1 proposes a ferritic stainless steel having excellent high-temperature corrosion resistance and high-temperature creep strength. However, the invention described in Patent Document 1 was intended to induce only precipitation of the Laves phase to secure high-temperature strength, and the effect of carbonitrides in this technique was not taken into account. In addition, for the purpose of improving the high-temperature tensile strength of steel, it is suggested that one or two or more kinds of Cu (0.01-2.00 wt %) or Co (0.01-2.00 wt %) are contained, but Cu adversely affects the surface sporadic cracking of chromium steel, and manufacturing costs may increase due to significantly expensive Co.

In addition, in Patent Document 2, a technique for providing excellent resistance to high temperature deformation as well as oxidation resistance by adding a specific element when manufacturing a heat-resistant ferritic steel alloy has been proposed. However, since the invention described in Patent Document 2 discloses that Al is contained in a range of 3.5 to 8 wt % and thus has a high Al component composition, manufacturability is not good. In addition, since a significantly expensive alloy such as Zr is used for the steel chemical composition, there is a high possibility that a stable supply of raw materials cannot be secured.

PRIOR ART LITERATURE

Patent Literature (Patent Document 1) Japanese Patent Application JP2015-199627
(Patent Document 2) Korean Patent Application KR1988-0001640

SUMMARY OF INVENTION

Technical Problem

An aspect of the present disclosure is to provide a chromium steel sheet exhibiting high temperature oxidation resistance by introducing a stable oxide layer with an alloy of chromium and aluminum, as well as having excellent high-temperature strength by precipitating the Laves phase and carbide on ferrite that is a constituent phase of steel, by using alloy design and heat treatment, unlike the prior art described above, and to provide a method of manufacturing the same.

However, the problems to be solved by the present disclosure are not limited to the problems mentioned above, and other problems not mentioned will be clearly understood by those skilled in the art from the following descriptions.

Solution to Problem

According to an aspect of the present disclosure, a chromium steel having excellent high-temperature oxidation resistance and high-temperature strength includes, by weight %, 0.1% or less of C (not including 0%), 0.7% or less of Si (not including 0%), 0.1% or less of Mn (not including 0%), 0.01% or less of S (not including 0%), 0.03% or less of P (not including 0%), 27-33% of Cr, 3.5% or less of Al (not including 0%), 2.5% or less of Nb (not including 0%), 6.5% or less of W (not including 0%), 0.5% or less of Mo (not including 0%), 0.3% or less of Ti (not including 0%), 0.015% or less of N (not including 0%) and the remainder being Fe and unavoidable impurities, the chromium steel satisfying the following relational expression (1), (Cr−SUM)(Al−SUM)≥45, [Relational Expression 1]

where SUM is a formula related to contents of a specific element and impurity elements, and specifically indicates a total content of Cu+Co+V+La+Ce+Zr+Ta+Hf+Re+Pt+Ir+Pd+Sb+100N.

The steel may have a microstructure including ferrite.

In a microstructure of the steel, the number of precipitates having a diameter of 500 nm or less and including Laves phase and carbonitride may be present in a range of 10/μm² or more.

Precipitates having a diameter of 500 nm or less may be Fe₂ (Nb,W,Mo,Ti) in the case of a Laves phase, and may be (Nb,W,Mo,Ti)(C,N) in the case of carbonitride.

According to another aspect of the present disclosure, a method of manufacturing a chromium steel sheet having excellent high-temperature oxidation resistance and high-temperature strength includes, hot-rolling a steel slab having the above-described composition to a finish rolling temperature of 1200° C. or higher to manufacture a hot-rolled steel sheet, followed by cooling;

reheating the cooled hot-rolled steel sheet in a temperature range of 1050 to 1300° C. for at least 30 minutes to perform solution treatment; and normalizing or quenching the solution-treated hot-rolled steel sheet to room temperature at a cooling rate of 1° C./s or more.

Advantageous Effects of Invention

In the present disclosure with the configuration as described above, when exposed for 1500 hours in an environmental condition with a constant supply of water vapor in an electrical resistance furnace maintained at a temperature of 800° C., high temperature oxidation resistance may be excellent as a level of 30% or less of an oxidation amount of 310 austenitic stainless steel consisting of 25 wt % of Cr, 20 wt % of Ni and the remainder Fe and unavoidable impurities. In addition, a chromium steel sheet that has superior strength at high temperatures of 700° C. or higher than strength of ASTM A213 92 grade steel and 310 austenitic stainless steel may be provided.

BEST MODE FOR INVENTION

Figure 1:
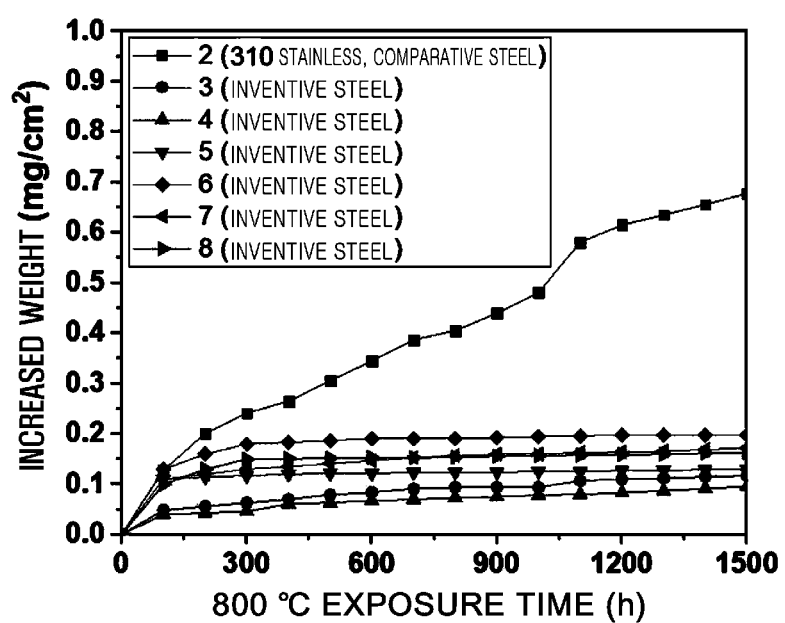
FIG. 1 illustrates a result of comparative steel 2 and Inventive Steels 3 to 8 in an exposure test for up to 1500 hours in an environmental condition in which water vapor is constantly supplied in an electrical resistance furnace maintained at a temperature of 800° C., which is a high-temperature oxidation resistance evaluation experiment of the present disclosure.

Hereinafter, the present disclosure will be described.

As described above, conventional low-alloy-based ferrite, bainite and martensitic heat-resistant chromium steels have disadvantages in that high-temperature oxidation and high-temperature strength are significantly inferior in conditions of more than 620° C. In the case of replacing them with austenitic stainless steels guaranteed to be used at high temperatures of 650° C. or less, it is expected that the limitations due to poor physical properties will be significantly large. On the other hand, nickel superalloys may be used even at high temperatures of 700° C. or higher, but have the disadvantage of being significantly expensive.

In order to solve the problems of the conventional technique, the present inventors repeated research and experiments. As a result, the amounts of Nb,W,Mo, and Ti added were optimized in a chromium steel alloy containing 27 to 33% of Cr, and at the same time, processes such as hot rolling temperature, solution treatment temperature and cooling rate are optimized, such that it can be confirmed that chromium steel having excellent high temperature oxidation resistance and high temperature strength may be obtained in the present disclosure.

The chromium steel excellent in high temperature oxidation resistance and high temperature strength of the present disclosure includes, by weight %, C: 0.1% or less (excluding 0%), Si: 0.7% or less (excluding 0%), Mn: 0.1% or less (excluding 0%), S: 0.01% or less (excluding 0%), P: 0.03% or less (excluding 0%), Cr: 27 to 33%, Al: 3.5% or less (excluding 0%), Nb: 2.5% or less (excluding 0%), W: 6.5% or less (excluding 0%), Mo: 0.5% or less (excluding 0%), Ti: 0.3% or less (excluding 0%), N: 0.015% or less (excluding 0%, the remainder Fe and unavoidable impurities, and satisfies the above relational expression 1.

Hereinafter, the reason for limiting the components of the chromium steel having excellent high-temperature oxidation resistance and high-temperature strength of the present disclosure will be described, and "%" herein represents "wt %" unless otherwise specified.

Carbon (C): 0.1% or Less (Excluding 0%)

Since carbon is the most important element for securing basic strength, it needs to be contained in steel within an appropriate range. In particular, it may be effective in improving high-temperature strength by inducing carbonitride. However, if the carbon content in the steel exceeds 0.10%, there is a disadvantage in that precipitates are excessively formed and weldability is greatly reduced.

Therefore, in the present disclosure, it is preferable to limit the carbon content to 0.1% or less. More preferably, the carbon content is limited to 0.05% or less.

Silicon (Si): 0.7% or Less (Excluding 0%)

As a substitutional element, the silicon improves the strength of steel through solid solution strengthening and has a deoxidizing effect, and thus, is an essential element in the manufacture of clean steel, and accordingly, the addition thereof is preferably. However, in a case in which a large amount is added, the crackability of the material may be increased by generating a sigma phase, and while the formation of beneficial precipitates such as carbides is essential, silicon plays a role in suppressing the formation of carbides. Therefore, in the present disclosure, it is preferable to control the silicon content to 0.7% or less. More preferably, the content of the silicon is limited to 0.3% or less.

Manganese (Mn): 0.1% or Less (Excluding 0%)

The manganese serves to improve strength by solid solution strengthening. Also, it reacts with sulfur to precipitate MnS, which is beneficial in preventing high-temperature cracking caused by sulfur segregation. On the other hand, as the manganese content increases, the fraction of MnS inclusions increases, which may increase the crack susceptibility due to inclusion defects. Therefore, in the present disclosure, it is preferable to control the manganese content to 0.1% or less. More preferably, the manganese content is limited to 0.05% or less.

Sulfur (S): 0.01% or Less (Excluding 0%)

The sulfur is an impurity element, and when its content exceeds 0.01%, ductility and weldability of steel are deteriorated.

Therefore, it is preferable to limit the sulfur content to 0.01% or less.

Phosphorus (P): 0.03% or Less (Excluding 0%)

The phosphorus is an element that exerts a solid solution strengthening effect, but when the content thereof exceeds 0.03% as an impurity element, as in sulfur, brittleness occurs in steel and weldability is deteriorated.

Therefore, it is preferable to limit the phosphorus content to 0.03% or less.

Chromium (Cr): 27 to 33%

The chromium is a ferrite stabilizing element, which reacts with oxygen to form a dense and stable protective film to increase high-temperature oxidation resistance and corrosion resistance. In particular, a chromium content of 27% or more is required to ensure oxidation resistance at a high temperature of 700° C. or higher, but when the contain exceeds 33%, there is a problem in that manufacturing costs may increase and weldability may decrease, which is not preferable. Therefore, in the present disclosure, it is preferable to limit the chromium content in the range of 27 to 33%. More preferably, the content of chromium is limited to 28 to 32%.

Aluminum (Al): 3.5% or Less (Excluding 0%)

The aluminum enlarges the ferrite area and is added as a deoxidizer during casting. Aluminum also reacts with oxygen to form a dense and stable protective film, increasing high-temperature oxidation resistance and corrosion resistance. However, when contained in the amount of more than 3.5%, it is not preferable because there is a problem in which castability may be deteriorated. Therefore, it is preferable to limit the content of aluminum to 3.5% or less. More preferably, the content of the aluminum is limited to 3.3% or less.

Niobium (Nb): 2.5% or Less (Excluding 0%)

The niobium is one of M(C,N) carbonitride forming and Laves phase forming elements. In addition, it is solid-solubilized during reheating of the slab and inhibits grain growth during hot rolling, and then precipitates to improve the strength of the steel. However, if niobium is excessively added in excess of 2.5%, there is a disadvantage in that weldability may be deteriorated, and manufacturing cost may be greatly increased. Therefore, it is preferable to limit the content of niobium to 2.5% or less. More preferably, the content of niobium is limited to 2.0% or less.

Tungsten (W): 6.5% or Less (Excluding 0%)

The tungsten affects solid solution strengthening to increase strength, and is one of M(C,N) carbonitride forming and Laves phase forming elements, and is an alloying element necessary for precipitation strengthening. However, as the amount of the tungsten alloy increases, the brittleness of the material may slightly increase, and there is a disadvantage that manufacturing costs may significantly increase. Therefore, it is preferable to limit the content of tungsten to 6.5% or less. More preferably, the content of the tungsten is limited to 6.0% or less.

Molybdenum (Mo): 0.5% or Less (Excluding 0%)

The molybdenum increases strength by increasing the solid solution strengthening effect, and is one of the M(C,N) carbonitride forming and Laves phase forming elements, and is an alloying element necessary for precipitation strengthening. However, if molybdenum is also excessively added as an expensive element, manufacturing costs may significantly increase, and if it exceeds 0.5%, there is a disadvantage in that a sigma phase may be generated to increase the cracking properties of the material. Therefore, it is preferable to limit the content of molybdenum to 0.5% or less. More preferably, the content of the molybdenum is limited to 0.4% or less.

Titanium (Ti): 0.3% or Less (Excluding 0%)

The titanium is also one of the elements for forming M(C,N) carbonitride and Laves phase, and is an alloying element necessary for precipitation strengthening. However, if the titanium is added in excess of 0.3%, the high temperature oxidation resistance may be reduced. Therefore, it is preferable to limit the content of titanium to 0.3% or less. More preferably, the content of the titanium is limited to 0.2% or less.

Nitrogen (N): 0.015% or Less (Excluding 0%)

Since it is difficult to industrially completely remove the nitrogen from steel, the upper limit thereof is 0.015%, which is an allowable range in the manufacturing process. Nitrogen is known as an austenite stabilizing element, and it plays a role in effectively increasing the high-temperature strength of steel by significantly increasing high-temperature stability when forming M(C,N) carbonitrides compared to simple MC carbides. However, when it exceeds 0.015%, it is combined with boron in impurities to form BN, or combined with chromium to thereby form $Cr_2N$ and Z-phase significantly coarsely, thereby reducing the beneficial effect of chromium, and may be combined with aluminum to form AlN. Therefore, there is a possibility that the risk of occurrence of defects in the steel is increased.

Therefore, it is preferable to limit the nitrogen content to 0.015% or less.

In addition, when the remainder Fe and unavoidable impurities are included, for example, Cu, Co, V, La, Ce, Zr, Ta, Hf, Re, Pt, Ir, Pd, Sb, or the like may be included. These impurity elements may be unavoidably mixed from raw materials or the surrounding environment in a normal manufacturing process, and thus, cannot be excluded.

In this case, it is preferable that the steel of the present disclosure has a chemical composition satisfying the following relational expression (1).

(Cr−SUM)(Al−SUM)≥45    [Relational Expression 1]

In this case, SUM is an expression related to the content of a specific element and impurity elements, and in detail, indicates the total content of Cu+Co+V+La+Ce+Zr+Ta+Hf+Re+Pt+Ir+Pd+Sb+100N.

For example, in the steel of the present disclosure, the beneficial effects of Cr and Al should be sufficiently considered, and it is necessary to control so that impurity elements that may inhibit the effect are not included in the steel of the present disclosure. In particular, for the N content in the defined 'SUM', a weight was given by multiplying the number 100. The reason for giving weight to the N content is because there is a high possibility that it may inhibit the beneficial effect of each element by combining with Cr or Al.

In the present disclosure, Cu, which is an element constituting the 'SUM', is highly likely to adversely affect the surface sporadic cracks of chromium steel. Among Co and other residual impurities, rare transition metals, rare earths and the like are significantly expensive, and thus, when they are included in steel grades, manufacturing costs are greatly increased, stable supply of raw materials is unlikely to be secured, and mechanical properties may deteriorate. V was included as an element that should not be included in the steel grade due to a low effect in high temperature strength increase compared to other elements and due to the recent sharp rise in price, according to the inventors' pre-experimental results. Therefore, the above relational expression 1 is derived by specifying, as SUM, the sum of weight % of the alloy elements that should not be included in the steel grade of the present disclosure.

Hereinafter, the microstructure and precipitates of the chromium steel of the present disclosure excellent in high temperature oxidation resistance and high temperature strength will be described in detail.

First, the steel of the present disclosure includes a ferrite structure as the matrix microstructure thereof.

In the microstructure of the steel of the present disclosure, it is preferable that the number of precipitates including Laves phase and carbonitride, with a diameter of 500 nm or less, are present in a range of $10/\mu m^2$ or more. If the number of precipitates with a diameter of 500 nm or less is less than $10/\mu m^2$, the distance between the precipitates becomes considerably large. Therefore, the effect of improving the strength at high temperature may not be large because dislocation movement at high temperature cannot be effectively prevented.

In the present disclosure, the precipitate having a diameter of 500 nm or less may include $Fe_2$ (Nb,W,Mo,Ti) in the case of the Laves phase, and may include (Nb,W,Mo,Ti)(C,N) in the case of carbonitride.

Next, a method of manufacturing a chromium steel having excellent high-temperature oxidation resistance and high-temperature strength according to an embodiment of the present disclosure will be described.

The method of manufacturing a chromium steel having excellent high temperature oxidation resistance and high temperature strength of the present disclosure includes a process of hot-rolling a steel slab having the above composition to a finish rolling temperature of 1200° C. or higher to manufacture a hot-rolled steel sheet, followed by cooling; a process of reheating the cooled hot-rolled steel sheet in a temperature range of 1050 to 1300° C. for at least 30 minutes to perform solution treatment; and a process of normalizing or quenching the solution-treated hot-rolled steel sheet to room temperature at a cooling rate of 1° C./s or more.

First, in the present disclosure, a steel slab having the above-described composition is hot rolled up to the finish rolling temperature of 1200° C. or higher to obtain a hot-rolled steel sheet. The reason for performing hot rolling in this manner is to increase the uniformity of the structure and to prevent an increase in the rolling load due to precipitates formed at less than 1200° C. Preferably, it is preferable that the upper limit of the finishing temperature is 1300° C. If the finishing temperature exceeds 1300° C., the ferrite grain size and the size of carbonitride become significantly coarse, and the number densities of carbonitride decreases, which causes inferior high-temperature physical properties.

And in the present disclosure, the manufactured hot-rolled steel sheet is cooled to room temperature.

Subsequently, in the present disclosure, the cooled hot-rolled steel sheet is reheated and subjected to solution treatment. At this time, the reheating temperature range is 1050 to 1300° C., and the reheating time is preferably for at least 30 minutes.

In a case in which the reheating temperature is less than 1050° C., it is not possible to induce sufficient recrystallization of the hot-rolled steel sheet, and anisotropy of the material may occur due to residual rolling structure. On the other hand, if the reheating temperature exceeds 1300° C., the grain size of ferrite and the size of the carbonitride become significantly coarse, and the number density of the carbonitride decreases, and thus, high-temperature physical properties may be inferior.

The reheating time is preferably performed for at least 30 minutes. If the reheating time is less than 30 minutes, there is a possibility that sufficient recrystallization of the hot-rolled steel sheet cannot be induced.

In the present disclosure, a process of normalizing or quenching the solution-treated hot-rolled steel sheet to room temperature at a cooling rate of 1° C./s or more is performed. In the present disclosure, since there is no phase transformation between austenite and ferrite, it is not significantly sensitive to the cooling rate, but care is taken not to form an unfavorable structure such as a sigma phase during cooling. Therefore, it is preferable to control the upper limit of the cooling rate to 50° C./s through accelerated air cooling or quenching in consideration of the capability of the production equipment.

MODE FOR INVENTION

Hereinafter, the present disclosure will be described in detail through examples.

Example

Hot-rolled steel sheets having an alloy composition illustrated in Table 1 below and a thickness of 12 to 13 mm were prepared. The sulfur (S) content was all controlled to be 30 ppm or less. Then, the hot-rolled steel sheet was reheated at various temperatures within the range of 1050 to 1300° C. for at least 30 minutes, and then cooled to room temperature by normalizing or quenching to prepare a steel sheet. On the other hand, in Table 1 below, steel grade 1 is a general ASTM A213 92 grade steel composition, and steel grade 2 is a 310 austenitic stainless steel composition. Steel grades 1 and 2 have a chemical composition that does not satisfy the above-mentioned relational expression 1, and the remaining steel grades 3 to 8 are all steel types simultaneously satisfying both the steel composition component and the relational expression 1 of the present disclosure.

For the alloy steels manufactured as described above, a method for evaluating high-temperature oxidation resistance is as follows. 15 specimens of a constant weight were produced identically for each steel grade, and exposed to environmental conditions in which water vapor was constantly supplied in an electric resistance furnace maintained at a temperature of 800° C. The weight increased by oxidation was extracted one by one every 100 hours to confirm the increased weight, and finally the increased weight to the last specimen of respective steel grades exposed for up to 1500 hours was confirmed, and the results are illustrated in Table 2. Unlike low-alloy general carbon steel, the oxide layer on the surface did not peel off easily, and thus, it was possible to measure the weight increase due to oxidation.

Figure 2:
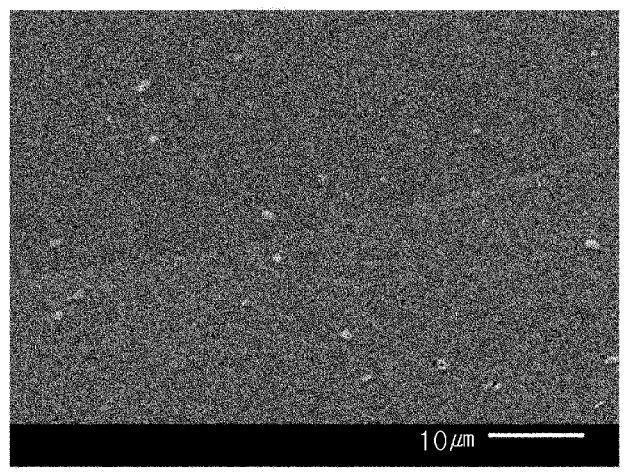
FIG. 2A is a scanning electron microscope (SEM) photograph illustrating the microstructure of Inventive Steel 3 after reheating at 1200° C. for 30 minutes, normalizing and cooling to room temperature.
FIG. 2B is a scanning electron microscope photograph illustrating the microstructure observation results of Inventive Steel 3, after reheated at 1200° C. for 30 minutes, normalized and cooled to room temperature, and exposed to 750° C. for 1500 or more hours.
Figure 2:
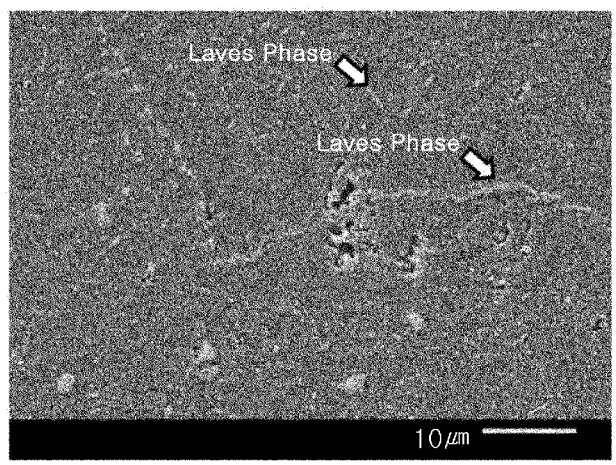
Figure 3:
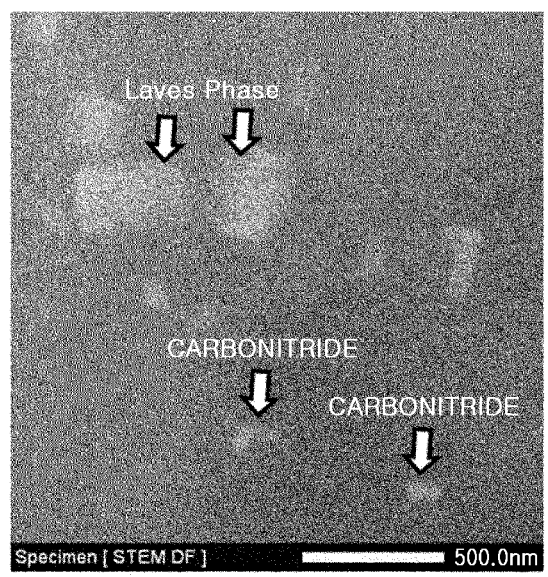
FIG. 3 is a transmission electron microscope (TEM) photograph of a steel grade 3 steel sheet, which is one of the invention steels used in the experiment of the present disclosure.
Figure 4:
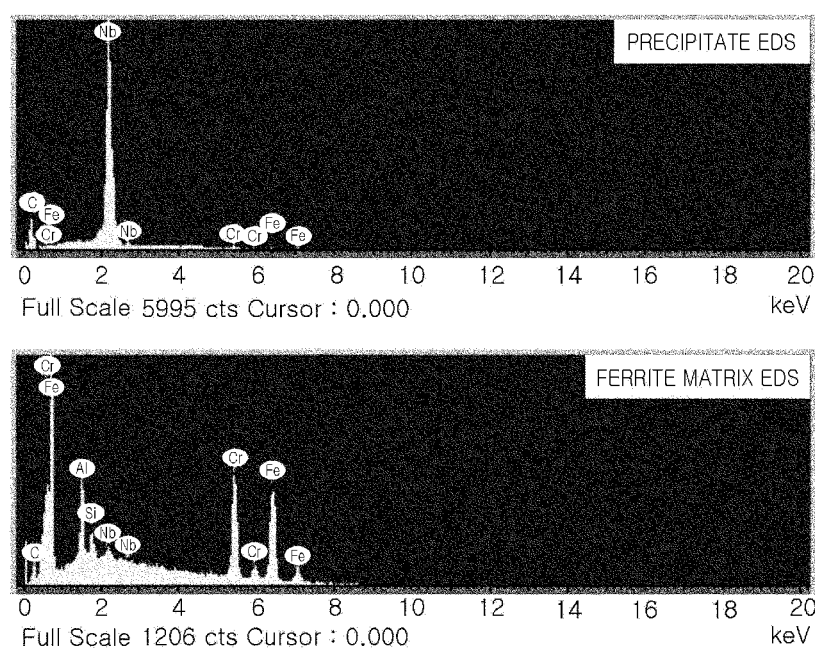
FIG. 4 is an energy dispersive X-ray spectroscope (EDS) result photograph confirming the chemical composition of the inventive steel 3 steel sheet of FIG. 3.

Meanwhile, the microstructure was observed using a scanning electron microscope (SEM) for a portion of the prepared alloy steel specimen, and the results are illustrated in FIG. 2. The Laves phase was accurately observed using a transmission electron microscope (TEM) and energy spectrometry, and the results are illustrated in FIGS. 3 and 4.

TABLE 1

| Steel Grade No. | Heat treatment | Steel composition (wt %) | | | | | | | | | | | | | |
|---|---|---|---|---|---|---|---|---|---|---|---|---|---|---|---|
| | | C | Si | Mn | P | Cr | Mo | W | Ni | Nb | Ti | V | N | Al | A* |
| 1 | 1070N 780T | 0.11 | 0.10 | 0.41 | 0.012 | 9.26 | 0.42 | 1.67 | 0.17 | 0.057 | 0.003 | 0.16 | 0.0462 | 0.01 | −21.4 |
| 2 | Casted product | 0.37 | 1.16 | 1.23 | 0.015 | 25.3 | 0.01 | 0.01 | 22.13 | — | — | — | 0.054 | 0.002 | −107.6 |
| 3 | 1200N | 0.04 | 0.7 | 0.01 | 0.004 | 29.7 | 0.006 | 0.01 | — | 0.89 | 0.01 | — | 0.004 | 2.48 | 60.5 |
| 4 | 1050Q | 0.01 | 0.20 | 0.01 | 0.005 | 32.5 | 0.004 | 0.01 | — | 1.04 | 0.01 | — | 0.003 | 3.02 | 87.0 |
| 5 | 1300Q | 0.01 | 0.18 | 0.01 | 0.006 | 29.4 | 0.005 | 0.01 | — | 2.49 | 0.01 | — | 0.004 | 2.95 | 73.3 |
| 6 | 1300Q | 0.1 | 0.20 | 0.01 | 0.008 | 26.9 | 0.007 | 0.01 | — | 1.01 | 0.3 | — | 0.005 | 2.96 | 64.4 |
| 7 | 1300Q | 0.01 | 0.19 | 0.01 | 0.007 | 30.5 | 0.5 | 0.01 | — | 1.01 | 0.01 | — | 0.004 | 3.33 | 87.6 |
| 8 | 1300Q | 0.02 | 0.21 | 0.01 | 0.004 | 30.8 | 0.01 | 6.5 | — | 1.05 | 0.05 | — | 0.015 | 3.21 | 49.5 |

In Table 1, heat treatment N is normalizing, heat treatment Q is quenching, heat treatment T is tempering, and the number in front of the letter means the temperature at which heat treatment is performed. And the normalizing/quenching/tempering time was at least 30 minutes. And A* represents the value calculated by Relational expression 1. In this case, the contents of the impurity elements used in the calculation of Relational expression 1 for respective steel grades are as follows. For steel grade 1, it is composed of Cu (0.004%), Co (0.003%), V (0.16%), N (0.0462%), and the sum (0.0025%) of other elements, for steel grade 2, composed of Cu (0.004%), Co (0.003%), V (0.002%), N (0.054%) and the sum (0.0035%) of other elements, for steel grade 3, composed of Cu (0.005%), Co (0.003%), V (0.004%), N (0.004%) and the sum of (0.0024%) of other elements, for steel grade 4, composed of Cu (0.005%), Co (0.003%), V (0.006%), N (0.003%) and the sum (0.0043%) of other elements, for steel grade 5, composed of Cu (0.005%), Co (0.003%), V (0.008%), N (0.004%) and the sum (0.0036%) of other elements, for steel grade 6, composed of Cu (0.005%), Co (0.003%), V (0.007%), N (0.005%) and the sum (0.0042%) of other elements, for steel grade 7, composed of Cu (0.005%), Co (0.003%), V (0.009%), N (0.004%) and the sum (0.0027%) of other elements, for steel grade 8, composed of Cu (0.005%), Co (0.003%), V (0.008%), N (0.015%) and the sum (0.0032%) of other elements.

TABLE 2

| Grade No. | | Mass gain for each steel grade (mg/cm$^2$) | | | | | | | Remark |
|---|---|---|---|---|---|---|---|---|---|
| | | 1 | 2 | 3 | 4 | 5 | 6 | 7 | 8 | |
| Mass gain measurement time (hr) | 0 | 0 | — | 0 | 0 | 0 | 0 | 0 | 0 | Final mass gain of Inventive Steels 3 to 8 being 30% or less compared to Comparative Steel 2, with excellent high temperature oxidation resistance |
| | 100 | | 0.128 | 0.049 | 0.04 | 0.11 | 0.13 | 0.11 | 0.10 | |
| | 200 | | 0.201 | 0.056 | 0.043 | 0.115 | 0.16 | 0.12 | 0.13 | |
| | 300 | | 0.241 | 0.063 | 0.046 | 0.117 | 0.18 | 0.13 | 0.15 | |
| | 400 | | 0.265 | 0.070 | 0.061 | 0.12 | 0.183 | 0.135 | 0.151 | |
| | 500 | | 0.306 | 0.079 | 0.063 | 0.121 | 0.187 | 0.141 | 0.152 | |
| | 600 | | 0.345 | 0.084 | 0.067 | 0.122 | 0.191 | 0.147 | 0.153 | |
| | 700 | | 0.387 | 0.091 | 0.070 | 0.123 | 0.191 | 0.153 | 0.153 | |
| | 800 | | 0.405 | 0.094 | 0.073 | 0.124 | 0.191 | 0.157 | 0.154 | |
| | 900 | | 0.440 | 0.094 | 0.075 | 0.124 | 0.193 | 0.160 | 0.156 | |
| | 1000 | | 0.481 | 0.094 | 0.078 | 0.125 | 0.195 | 0.160 | 0.157 | |
| | 1100 | | 0.581 | 0.107 | 0.080 | 0.125 | 0.196 | 0.163 | 0.158 | |
| | 1200 | | 0.615 | 0.110 | 0.083 | 0.127 | 0.198 | 0.164 | 0.159 | |
| | 1300 | | 0.635 | 0.112 | 0.087 | 0.128 | 0.198 | 0.166 | 0.160 | |
| | 1400 | | 0.656 | 0.115 | 0.091 | 0.129 | 0.198 | 0.169 | 0.162 | |
| | 1500 | | 0.678 | 0.117 | 0.096 | 0.13 | 0.198 | 0.172 | 0.163 | |

As illustrated in FIG. 1 and Table 2, in the case of chromium steels of Inventive Steels 3 to 8 in the present disclosure, it can be confirmed that the high temperature oxidation resistance is excellent at a level of 30% or less of the oxidation amount of 310 austenitic stainless steel consisting of 25 wt % of Cr, 20 wt % of Ni, and the remainder Fe and unavoidable impurities.

FIG. 2A is a scanning micrograph illustrating the microstructure of Inventive Steel 3, which was reheated at 1200° C. for 30 minutes and then normalized and cooled to room temperature, and FIG. 2B is a scanning electron microscope photograph illustrating the microstructure observation results of Inventive Steel 3, which was reheated at 1200° C. for 30 minutes and then normalized and cooled to room temperature, and exposed to 750° C. for 1500 hours or more.

In addition, FIG. 3 is a transmission electron micrograph illustrating the distribution of precipitates in Inventive Steel 3, which was reheated at 1200° C. for 30 minutes and then normalized and cooled to room temperature, and exposed to 750° C. for 1500 hours or more.

FIG. 4 is an energy dispersive X-ray spectroscope (EDS) result photograph confirming the chemical composition of the inventive steel 3 steel sheet of FIG. 3.

As illustrated in FIG. 2A, Inventive Steel 3 illustrates carbonitride precipitation having a diameter of 500 nm or less when reheated at 1200° C. for 30 minutes and then normalized and cooled to room temperature. And it was confirmed that Inventive Steel 3, which mainly contained Nb as a carbonitride precipitation element, showed carbonitride containing a lot of Nb.

Meanwhile, additionally, as illustrated in FIGS. 2B and 3, Inventive Steel 3 may additionally exhibit Laves phase precipitation by high-temperature heat treatment or high-temperature environmental conditions, such as exposure to 750° C. for 1500 hours or more. It was confirmed that Inventive Steel 3 mainly containing Nb as a Laves phase precipitation element showed a Laves phase containing a lot of Nb. It can be confirmed in FIG. 4 that the formed carbonitride and Laves phase mainly contain Nb.

In the case of other Inventive Steels 4-8, Nb,W,Mo, and Ti may be included as carbonitride forming elements and Laves phase forming elements, and thus, carbonitrides and Laves phase of 500 nm or less may be formed.

Meanwhile, high-temperature strength was measured for the manufactured steel grades.

The method of evaluating high-temperature strength is as follows. High-temperature tensile specimens were respectively prepared in the hot rolling direction by using ASTM E8 standard, and the high-temperature yield strength of these specimens was evaluated, and the results are illustrated in Table 3. Also, for comparison, the high-temperature strength evaluation results of ASTM A213 92 grade steel (comparative steel 1) and 310 austenitic stainless steel (comparative steel 2) provided by National Institute for Materials Science (NIMS), Japan are also illustrated in Table 3.

TABLE 3

| Steel grade No. | 0.2% yield strength, MPa | | |
|---|---|---|---|
| | 700° C. | 750° C. | 800° C. |
| 1 | 126 | 71 | 51 |
| 2 | 165 | 185 | 133 |
| 3 | 269 | 209 | 157 |
| 4 | 264 | 203 | 148 |
| 5 | 276 | 212 | 163 |
| 6 | 263 | 201 | 146 |
| 7 | 260 | 205 | 144 |
| 8 | 290 | 228 | 182 |

As illustrated in Table 3, it can be confirmed that the Inventive Steels 3 to 8 have higher yield strength than Comparative Steels 1 and 2 at a high temperature of 700° C. or higher. This is because during the high-temperature tensile test, material deterioration due to high-temperature oxidation occurred less in Inventive Steels 3 to 8, and it seems to be due to the precipitation hardening effect of carbonitrides and the additional precipitation hardening by the laves phase that may be precipitated during the tensile test.

As a result, in the present disclosure, it can be seen that the ferritic chromium steel, manufactured according to the suggested heat treatment method using elements such as chromium, aluminum and the like to ensure high-temperature oxidation resistance and using a precipitate-forming element to improve high-temperature yield strength, exhibits excellent high temperature oxidation resistance and high temperature strength.

The present disclosure is not limited to the above embodiments and examples, but it may be manufactured in various different forms, and those of ordinary skill in the art to which the present disclosure pertains will understand that it may be implemented in other specific forms without changing the technical spirit or essential features of the present disclosure. Therefore, it should be understood that the embodiments and examples described above are illustrative in all respects and not restrictive.

The invention claimed is:

1. A chromium steel, comprising: by weight %, 0.1% or less of C (not including 0%), 0.7% or less of Si (not including 0%), 0.1% or less of Mn (not including 0%), 0.01% or less of S (not including 0%), 0.03% or less of P (not including 0%), 27-33% of Cr, 3.5% or less of Al (not including 0%), 2.5% or less of Nb (not including 0%), 6.5% or less of W (not including 0%), 0.5% or less of Mo (not including 0%), 0.3% or less of Ti (not including 0%), 0.015% or less of N (not including 0%) and the remainder being Fe and unavoidable impurities, the chromium steel satisfying the following relational expression (1), wherein the steel has a microstructure including ferrite, and wherein in the microstructure of the steel, the number of precipitates having a diameter of 500 nm or less and including Laves phase and carbonitride are present in a range of $10/\mu m^2$ or $$(Cr-SUM)(Al-SUM) \geq 45, \quad \text{[Relational Expression 1]}$$

where SUM is a formula related to contents of specific elements and impurity elements, and specifically indicates a total content of Cu+Co+V+La+Ce+Zr+Ta+Hf+Re+Pt+Ir+Pd+Sb+100N.

2. The chromium steel of claim 1, wherein precipitates having a diameter of 500 nm or less are $Fe_2$(Nb,W,Mo,Ti) in the case of a Laves phase, and are (Nb,W,Mo,Ti)(C,N) in the case of carbonitride.

* * * * *